(12) United States Patent
Simon

(10) Patent No.: US 7,791,337 B2
(45) Date of Patent: Sep. 7, 2010

(54) METAL DETECTOR

(75) Inventor: Joseph S. Simon, Jackson, WI (US)

(73) Assignee: Carnes Company, Inc., Pewaukee, WI (US)

( * ) Notice: Subject to any disclaimer, the term of this patent is extended or adjusted under 35 U.S.C. 154(b) by 637 days.

(21) Appl. No.: 11/779,959

(22) Filed: Jul. 19, 2007

(65) Prior Publication Data
US 2009/0021252 A1 Jan. 22, 2009

(51) Int. Cl.
G01V 3/11 (2006.01)
G01N 27/72 (2006.01)

(52) U.S. Cl. .................. 324/228; 324/219; 324/239; 324/326

(58) Field of Classification Search ..............................
324/207.15–207.19, 219, 225, 228, 234,
324/236, 239, 256–259, 326–327, 329
See application file for complete search history.

(56) References Cited

U.S. PATENT DOCUMENTS

| 3,872,380 | A | 3/1975 | Gardiner |
| 4,016,486 | A | 4/1977 | Pecori |
| 4,213,093 | A | 7/1980 | Pecori |
| 4,283,680 | A | 8/1981 | Kerr |
| 4,303,879 | A | 12/1981 | Podhrasky |
| 4,334,192 | A | 6/1982 | Podhrasky |
| 4,709,213 | A | 11/1987 | Podhrasky |
| 5,521,583 | A | 5/1996 | Frahm et al. |
| 5,572,121 | A | 11/1996 | Beswick |
| 5,691,640 | A | 11/1997 | King |
| 5,721,489 | A | 2/1998 | Weaver et al. |
| 5,896,031 | A | 4/1999 | King |
| 6,476,610 | B1 | 11/2002 | Wiegert et al. |
| 6,857,567 | B2 | 2/2005 | Latimer et al. |
| 7,061,236 | B2 | 6/2006 | Britton |
| 2006/0091888 | A1 | 5/2006 | Holman et al. |

OTHER PUBLICATIONS

Mexican Patent Office Action for Application No. MX/a/2007/009169 dated Jan. 18, 2010 (7 pages) with English translation.
Mexican Patent Application No. MX/a/2007/009169 Notice of Allowance dated Apr. 22, 2010; 1 page.

Primary Examiner—Bot L LeDynh
(74) Attorney, Agent, or Firm—Michael Best & Friedrich LLP

(57) ABSTRACT

A vibration canceling circuit for a metal detector. The metal detector includes a transmit coil, first and second receive coils, a differential circuit coupled to the first and second receive coils, a controller coupled to the differential circuit, and a vibration canceling circuit coupled to the controller. The controller uses a signal provided by the vibration canceling circuit to remove a vibration component from a metal detection signal.

8 Claims, 3 Drawing Sheets

METAL DETECTOR

BACKGROUND

The invention relates to metal detectors, and specifically to electronic circuits for metal detectors. Metal detectors commonly include an oscillator (or transmit) coil and two detector (or receive) coils. The detector coils are typically positioned on either side of the oscillator coil and substantially equidistant therefrom. The oscillator coil is provided with an oscillatory signal that is inductively coupled to the detector coils. Metal passing through the coils causes an imbalance in the inductively coupled signals, which can be used to detect the presence of metal.

Vibration of the metal detector can result in the metal detector falsely determining that there is metal in the metal detector. To compensate for the false determinations of metal due to vibration, the sensitivity of the metal detector can be reduced. Reducing sensitivity, however, can result in some metal in the metal detector not being detected properly.

SUMMARY

In one embodiment, the invention provides a metal detector including a transmit coil, first and second receive coils, a differential circuit coupled to the first and second receive coils, a controller coupled to the differential circuit, and a vibration canceling circuit coupled to the controller.

In another embodiment the invention provides a method of reducing a vibration component of a detection signal in a metal detector. The method includes detecting movement of the metal detector on a first axis, generating a first signal indicative of the movement on the first axis, providing a signal based on at least the first signal to a controller, and modifying a detection signal based on the signal provided to the controller.

In another embodiment the invention provides a vibration detection circuit, including an accelerometer configured to generate a one or more signals, each signal indicative of movement along an axis, a combining filter configured to filter a component of the one or more signals not associated with movement and to combine the components of the one or more signals indicative of movement, an amplifier configured to amplify the combined signal, and an analog to digital converter configured to convert the amplified signal into a digital value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it should be understood that embodiments of the invention include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. Similarly, some embodiments of the present invention described herein operate utilizing software. One of ordinary skill in the art, and based on a reading of this detailed description, would recognize that, in at least one embodiment, such embodiments could instead operate without software, instead utilizing electronic circuitry and other hardware configured to perform the same functions. As such, it should be noted that any number and combination of hardware-based devices, software-based devices, and structural components may be utilized to implement the various embodiments of the present invention. Also, although various components of the present invention are described and illustrated herein as being defined by modules, it will be appreciated that the modules described and illustrated herein can be configured in a significantly different manner, can be defined by one or more other modules performing additional tasks, and/or can be defined by fewer modules.

Figure 1:
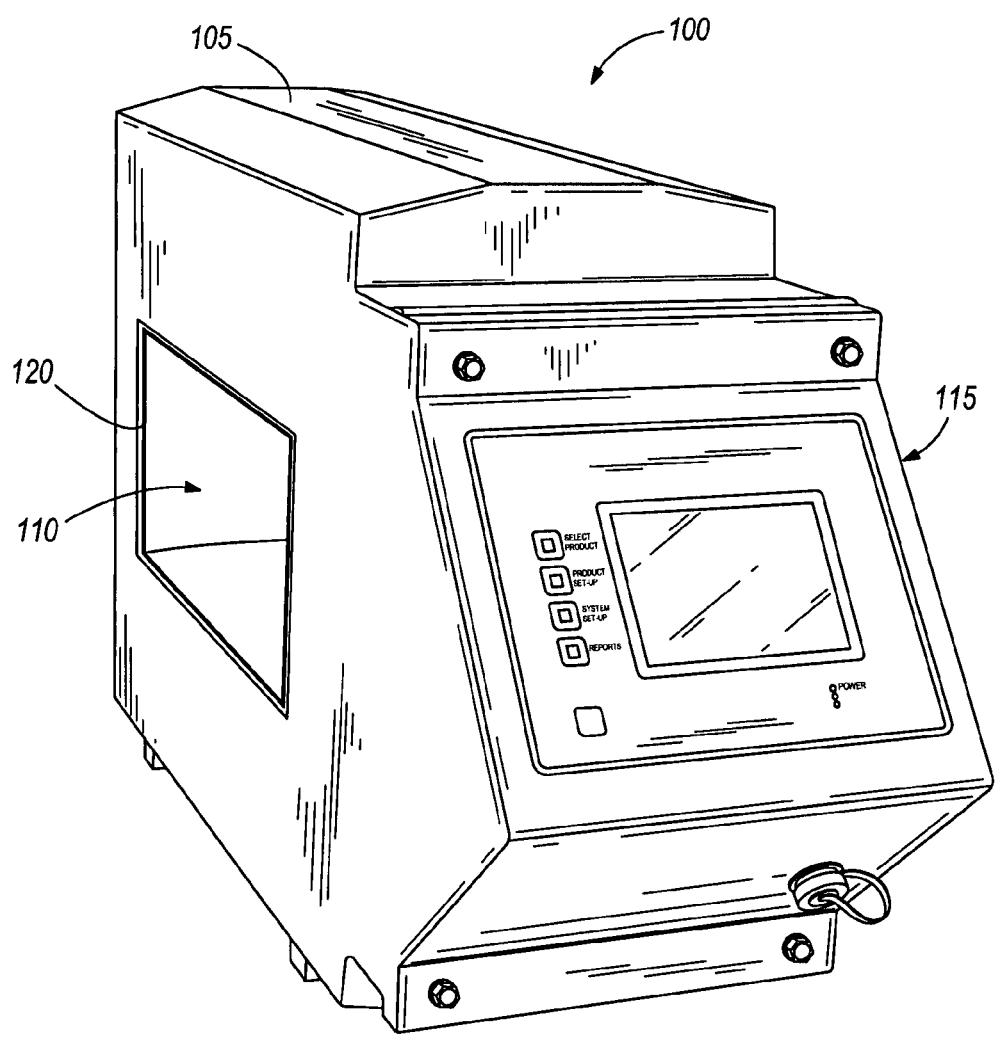
FIG. 1 is a perspective view of a metal detector incorporating an embodiment of the invention.

FIG. 1 illustrates a metal detector 100 embodying the present invention. The metal detector 100 includes a housing 105 having a passageway 110 therethrough, an operator interface 115 (e.g., a touch-screen LCD), a transmit coil, and a plurality of receive coils. A material to be tested for the presence of metal is passed through the passageway 110. If the metal detector 100 detects that metal is present in the material, the metal detector 100 takes an action (e.g., displays/sounds an alarm, stops a conveyor). In some constructions, the material (e.g., a food product) is on a conveyor (not shown) which passes through the passageway 110. Metal that is too close to an aperture 120 of the passageway 110 will be detected by the metal detector 100. In addition, metal that is moving (e.g., vibrating) will be detected by the metal detector 100 at a greater distance from the aperture 120 than metal that is stationary.

Vibration of the metal detector 100, caused, for example, by vibration of a structure supporting the metal detector 100, can result in a detection circuit of the metal detector 100 generating signals, which the metal detector 100 determines to be metal in the passageway 110. The signals can be created by metal that is outside the passageway 110 and normally stationary, but appearing to vibrate relative to the metal detector 100, as a result of vibration of the metal detector 100. In addition, the signals produced by the transmit coil and received by the receive coils can be distorted by the vibration of the metal detector 100. Embodiments of the invention detect vibration of the metal detector 100 and remove components of the signals produced as a result of the vibration, leaving substantially the signals produced by materials in the passageway 110.

Figure 2:
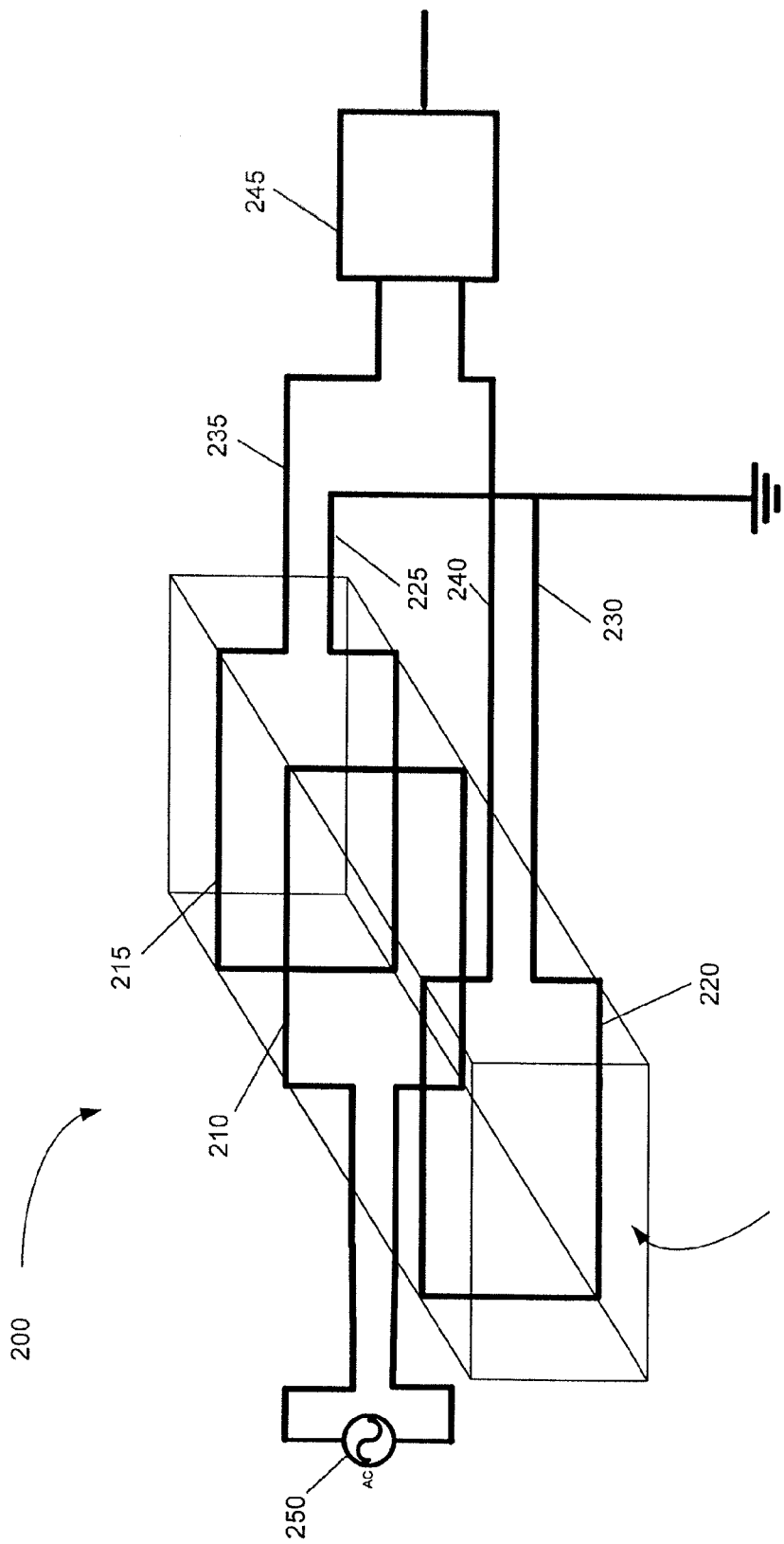
FIG. 2 is a schematic representation of a prior art metal detector.

FIG. 2 schematically illustrates a construction of a prior art metal detector 200. The metal detector 200 includes a passageway 205. A transmit coil 210 is positioned around the passageway 205. A first receive coil 215 and a second receive coil 220 are positioned around the passageway 205 on opposite sides of the transmit coil 210, substantially equidistant from the transmit coil 210. A first lead 225 of the first receive coil 215 and a first lead 230 of the second receive coil 220 are connected to ground. A second lead 235 of the first receive coil 215 and a second lead 240 of the second receive coil 220 are connected to a differential circuit 245.

During operation of the metal detector 200, an oscillatory signal 250 (e.g. an AC signal) is supplied to the transmit coil 210. The transmit coil 210 transmits a signal, based on the oscillatory signal, and the first receive coil 215 and the second receive coil 220 receive, via inductive coupling, the signal transmitted by the transmit coil 210. The first and second receive coils 215, 220 each generate an output signal based on the signals they receive from the transmit coil 210. When there is no material, particularly no metallic material, in the passageway 205 (i.e., the passageway 205 is empty), the signals received by, and output by, the first and second receive coils 215 and 220 should be substantially equivalent. The differential circuit 245 compares the output of the first receive coil 215 to the output of the second receive coil 220, and outputs a signal indicative of a difference in the signals. In the case where there is no material in the passageway 205, the signals should be substantially equivalent, and the differential circuit 245 outputs a signal with a zero or near zero signal (e.g, a zero amplitude analog signal, or a digital zero value).

When a non-metal material (e.g., a food product) enters the passageway 205, the signals received by the first receive coil 215 and the second receive coil 220 differ. The amplitude of these signals can differ significantly but the phase angles of the signals will generally be different than the phase angle generated by a metal. Therefore, the outputs of the first receive coil 215 and the second receive coil 220, amplitude and phase angle, will differ. The differential circuit 245 then outputs a signal (e.g., analog or digital) indicative of the difference between the first receive coil 215 output and the second receive coil 220 output.

When a piece of metal (ferrous or non-ferrous) enters the passageway 205, the metal distorts the signal transmitted by the transmit coil 210, and therefore, the signals received by the first receive coil 215 and the second receive coil 220. The distortion is greater nearer the metal, and therefore, the receive coil nearer the metal receives a signal having a greater distortion than the receive coil that is farther away from the metal. Accordingly, the outputs of the first receive coil 215 and the second receive coil 220 can differ relatively significantly when metal is present in the passageway 205. The differential circuit 245 receives the different signals from the first receive coil 215 and the second receive coil 220 and generates an output (e.g., analog or digital) indicative of the difference. The metal detector 200 receives the output of the differential circuit 245 and detects the presence of metal in the passageway 205, taking appropriate action (e.g., sounding an alarm, stopping a conveyor, etc.).

As discussed above, vibration of the metal detector 200 can result in distortion of the signals received by the first and/or second receive coils 215, 220. If components of the signals produced by the first and second receive coils 215, 220 as a result of that vibration are not removed, the metal detector 200 can incorrectly determine that metal exists in the passageway 205 when, in fact, it does not.

Figure 3:
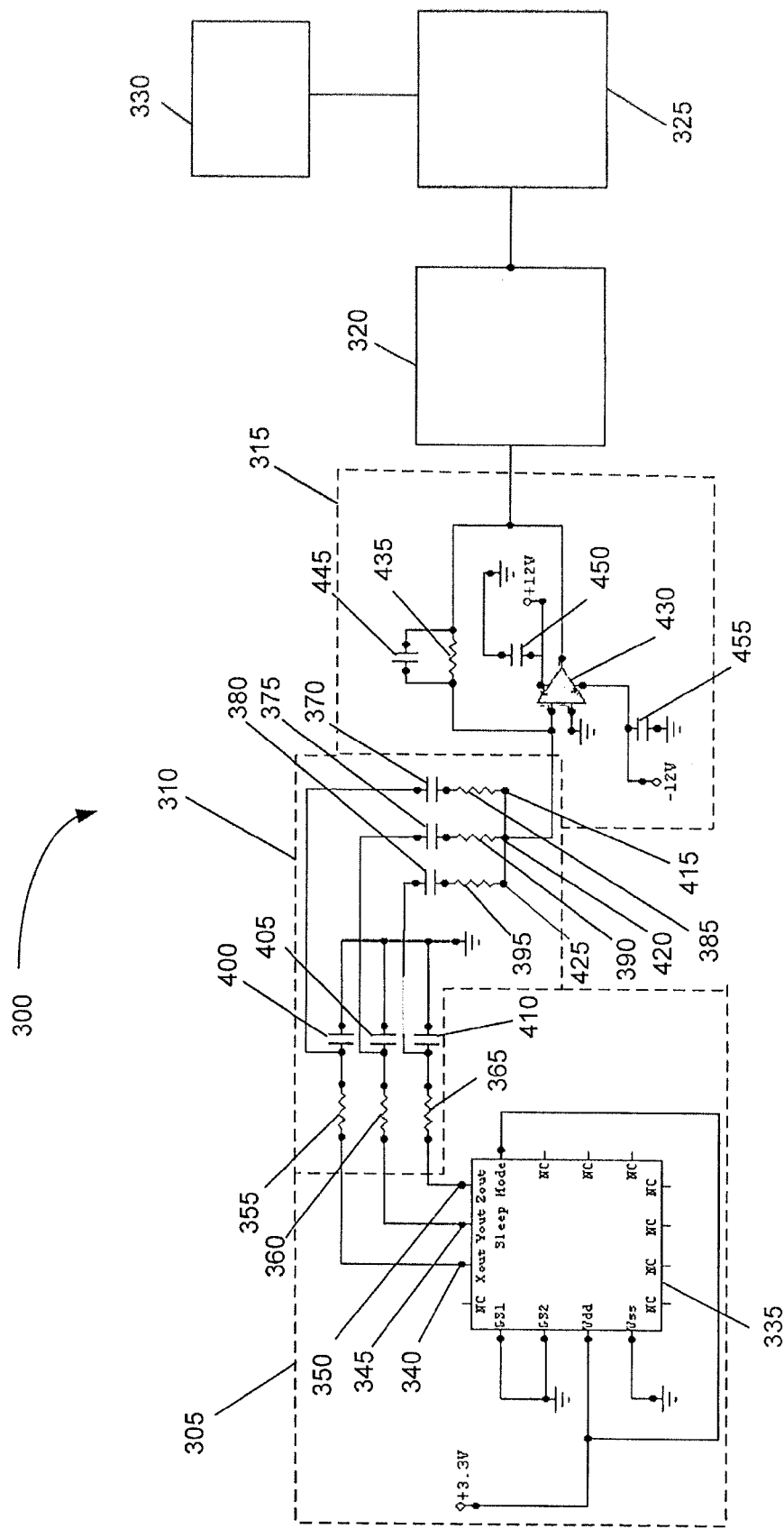
FIG. 3 is a partial schematic/partial block diagram of a vibration canceling circuit according to an embodiment of the invention.

FIG. 3 is a schematic/block diagram of a vibration canceling circuit 300 for detecting vibration of the metal detector 100, and removing a vibration component from a detected signal, leaving a relatively clean (i.e., reduced vibration component) metal detection signal. The circuit 300 includes a vibration detection circuit 305, a filter 310, an amplifier 315, an analog-to-digital (A/D) converter 320, and a controller 325. A metal detector receive circuit 330 is also shown.

The vibration detection circuit 305 includes an accelerometer 335 (e.g., model MMA7260Q manufactured by Freescale Semiconductor). The accelerometer 335 is mounted to the metal detector 100 and detects movement of the metal detector 100 in one or more of three axes (x, y, and/or z), each axis orthogonal to the other axes. The accelerometer 335 includes an output for each axis: x-out 340, y-out 345, and z-out 350. The accelerometer 335 produces signals on the outputs 340, 345, and 350 indicative of the movement of the accelerometer 335 in the output's respective axis. The outputs 340, 345, and 350 may contain a direct current (DC) component, depending on the orientation of the accelerometer 335 and the orientation of the metal detector 100, representing the gravitational force of the earth.

Each output 340, 345, and 350 is coupled to a circuit in the filter 310 comprising a first resistor 355, 360, and 365 connected in series with a first capacitor 370, 375, and 380, and a second resistor 385, 390, and 395. A second capacitor 400, 405, and 410 is connected between the connection of the first resistor 355, 360, and 365 and the first capacitor 370, 375, and 380 and ground. Leads 415, 420, and 425 of the second resistors 385, 390, and 395 are connected together and connected to the amplifier 315.

In some constructions, one or more of the second resistors 385, 390, and 395 may be removed from the filter 310, disconnecting the respective output(s) 340, 345, and 350 from the vibration detection circuit 305. Removing one or more of the second resistors 385, 390, and 395 results in the vibration detection circuit 305 detecting motion on one or two axes instead of three axes.

The filter 310 removes the DC component of the outputs 340, 345, and 350 and effectively combines the signals indicative of the movement of the accelerometer 335. The combined signals are then amplified (e.g., 250 times) by the amplifier 315.

The amplifier 315 includes an op amp 430, configured as an inverting amplifier, including a resistor 435, and capacitors 445, 450, and 455. The amplifier 315 provides the combined and amplified signal to the A/D converter 320 which converts the combined and amplified analog signal into a digital value. The digital value is then fed into the controller 325. Simultaneously, the controller 325 receives, from the differential circuit 330, a digital value representing an amplified differential signal from the receive coils. The controller 325 modifies the digital value representing the amplified differential signal from the receive coils using the digital value representing the combined and amplified accelerometer 335 outputs 340, 345, and 350 (e.g., subtracts the combined accelerometer signals from the differential signal) to obtain a value representing a relatively clean (i.e., reduced vibration component) metal detection value. In some embodiments, the controller 325 implements a delay and scaling to the accelerometer 335 signal or the differential signal to match the two signals together.

The controller 325, as discussed above can be in the form of a microcontroller or microprocessor and can include other components such as a power supply, memory, A/D converters, and filters. Further, it is envisioned that components shown in the embodiments above can be combined and/or separated resulting in different arrangements of the circuits.

The invention has been described in constructions and embodiments of metal detectors; however, the invention has application in other inductive coupled detectors subject to vibration.

Thus, the invention provides, among other things, a new and useful vibration canceling circuit for a metal detector. Various features and advantages of the invention are set forth in the following claims.

What is claimed is:

1. A metal detector comprising:
   a transmit coil;
   first and second receive coils inductively coupled to the transmit coil;
   a differential circuit coupled to the first and second receive coils;
   a controller coupled to the differential circuit; and
   a vibration canceling circuit coupled to the controller, the vibration canceling circuit including an accelerometer configured to generate a first signal indicative of movement along an axis, the vibration canceling circuit generating a second signal based on the first signal;
   wherein the controller receives the second signal from the vibration canceling circuit and a third signal from the differential circuit, the controller using the second signal to modify the third signal and generate a metal detection signal, the metal detection signal having a component related to movement of the metal detector substantially removed.

2. The metal detector of claim 1, wherein the first and second receive coils are positioned substantially equidistantly on opposite sides of the transmit coil.

3. The metal detector of claim 1, wherein the vibration canceling circuit includes a vibration detection circuit which provides a plurality of first signals indicative motion on two or more axes, wherein each axis is orthogonal to the other axes.

4. The metal detector of claim 1, wherein the vibration canceling circuit includes a filter and an amplifier.

5. The metal detector of claim 1, wherein the vibration canceling circuit includes a vibration detection circuit providing a plurality of first signals, each first signal indicative of motion on an axis.

6. The metal detector of claim 5, wherein the plurality of first signals are filtered and combined, and the combined signal is amplified and provided to the controller.

7. The metal detector of claim 1, wherein the accelerometer is coupled to a passageway, the accelerometer detecting vibration of the passageway.

8. The metal detector of claim 1, wherein the second signal is converted to a digital value before being provided to the controller.

* * * * *